United States Patent [19]

Linke

[11] Patent Number: 4,688,326

[45] Date of Patent: Aug. 25, 1987

[54] METHOD OF MANUFACTURING A MODULAR MAGNETIC HEAD ASSEMBLY

[75] Inventor: George A. Linke, San Francisco, Calif.

[73] Assignee: Ampex Corporation, Redwood City, Calif.

[21] Appl. No.: 900,647

[22] Filed: Aug. 26, 1986

Related U.S. Application Data

[62] Division of Ser. No. 680,873, Dec. 12, 1984.

[51] Int. Cl.⁴ ............................................. G11B 5/42
[52] U.S. Cl. ...................................... 29/603; 360/129
[58] Field of Search .................. 29/603; 360/129, 121

[56] References Cited

U.S. PATENT DOCUMENTS 3,404,292 10/1968 Girdner .............................. 360/129
3,548,393 12/1970 Montel ........................... 360/129 X

*Primary Examiner*—Carl E. Hall

*Attorney, Agent, or Firm*—Elizabeth E. Strnad; Joel D. Talcott

[57] ABSTRACT

A nonmagnetic holder is made having a plurality of precisely located parallel grooves. Each groove has a reference lateral surface provided therein. Individual magnetic transducers are inserted in each groove with a lateral surface abutting the reference lateral surface within that groove. The transducers are preferably made by well known batch fabrication techiques. A locating element, such as a leaf spring, is provided in each groove to urge the transducer core against the reference surface and to firmly hold the transducer in a desired position during alignment and assembly. The modular structure allows inspecting the individual transducers for mechanical or electrical damages and their replacement, if necessary, prior to the final assembly. The multichannel head is then integrally joined together, for example by bonding. The rejection rate of the resulting modular multichannel head is significantly reduced.

15 Claims, 9 Drawing Figures

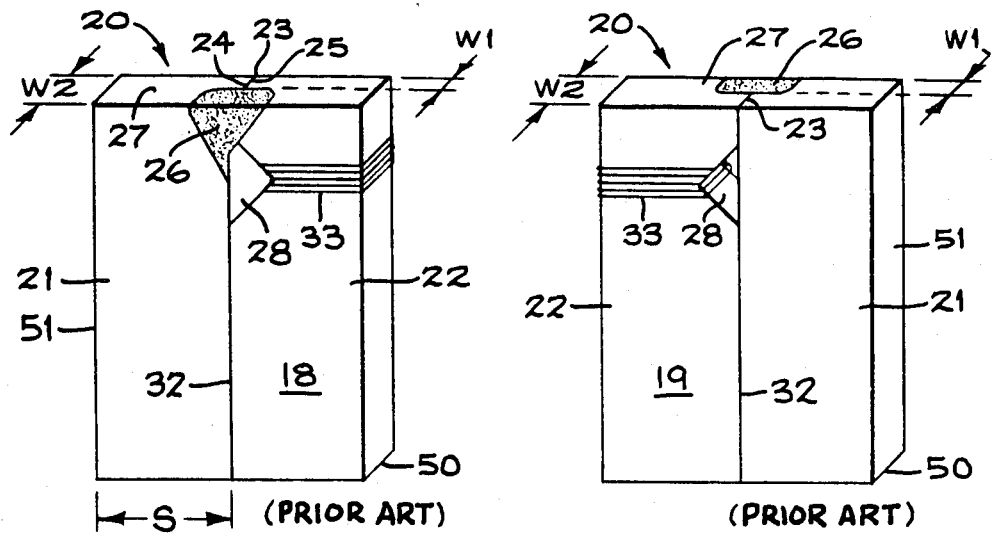
FIG_1A (PRIOR ART)  FIG_1B (PRIOR ART)
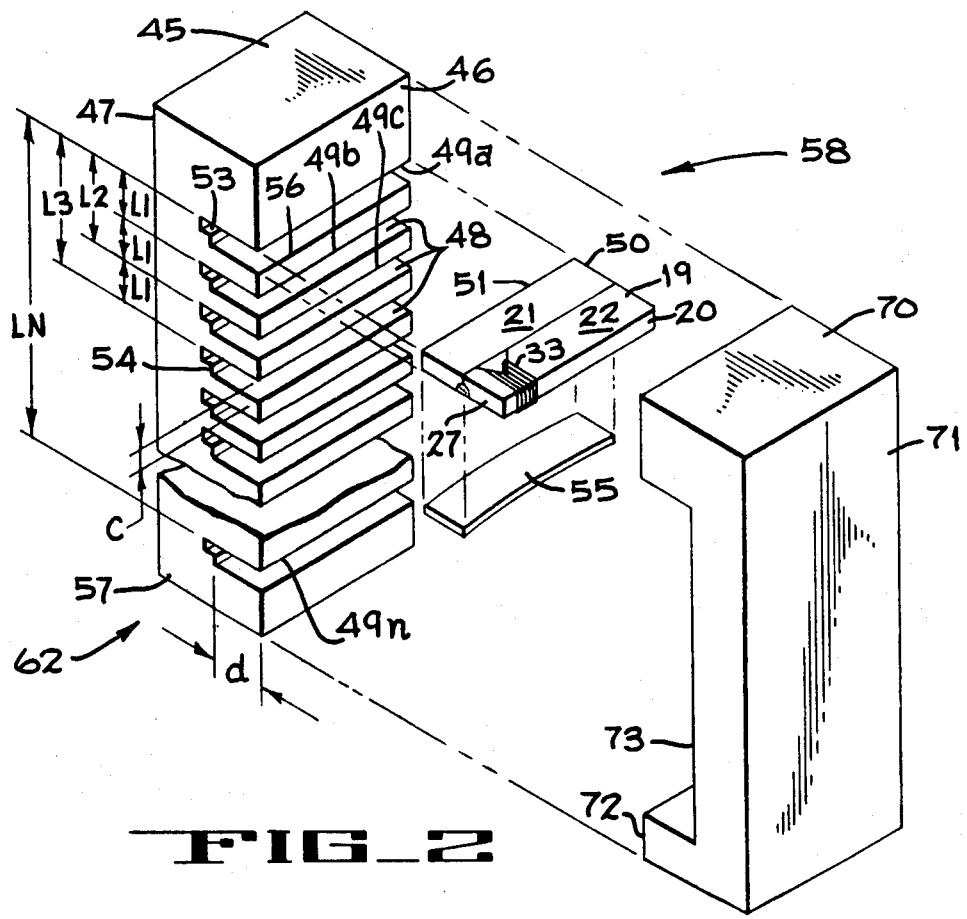
FIG_2

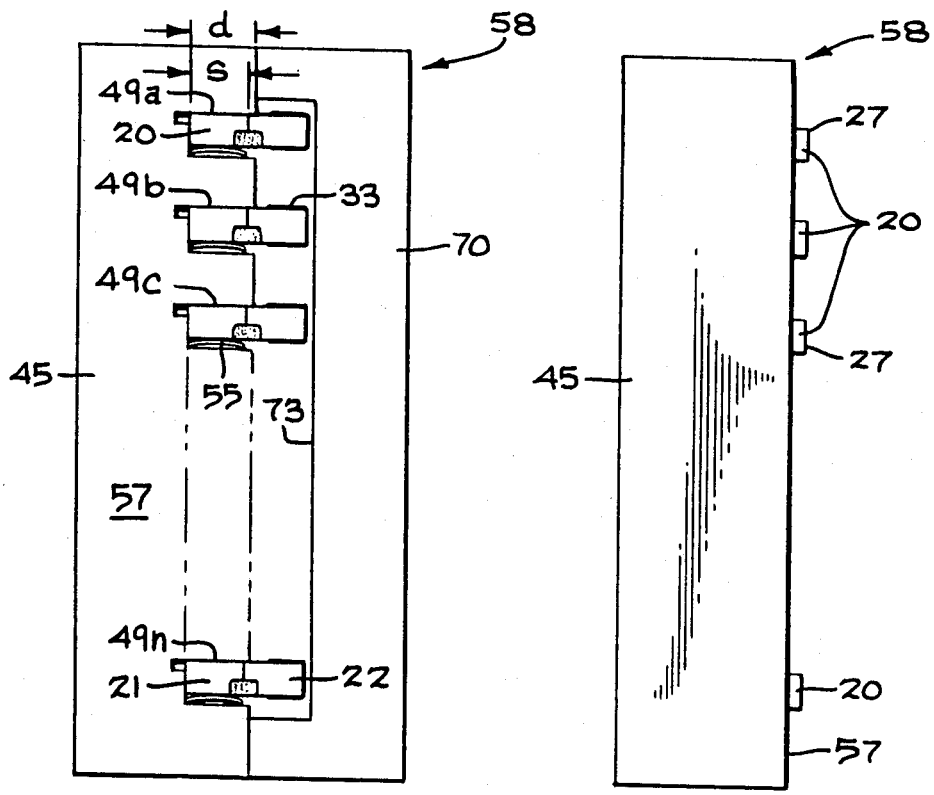
FIG_3A  FIG_3B
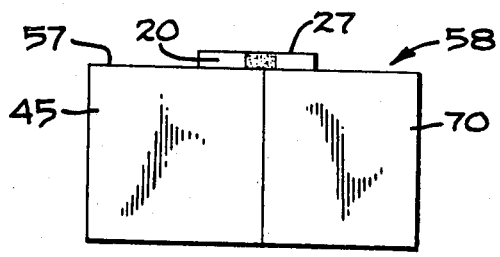
FIG_3C

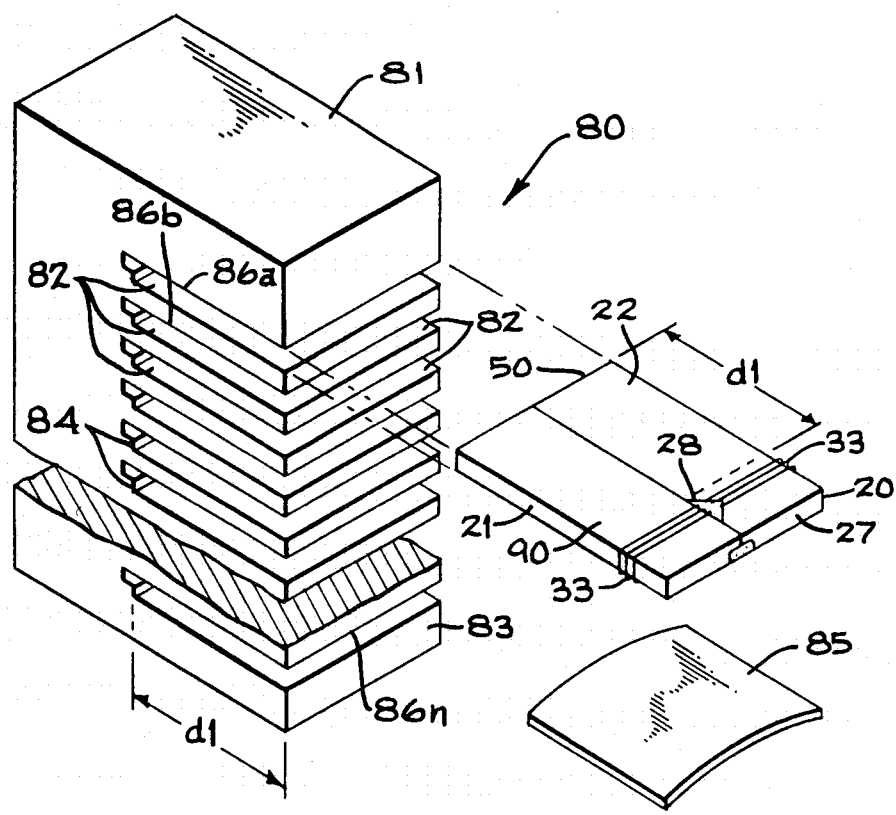
FIG_4A
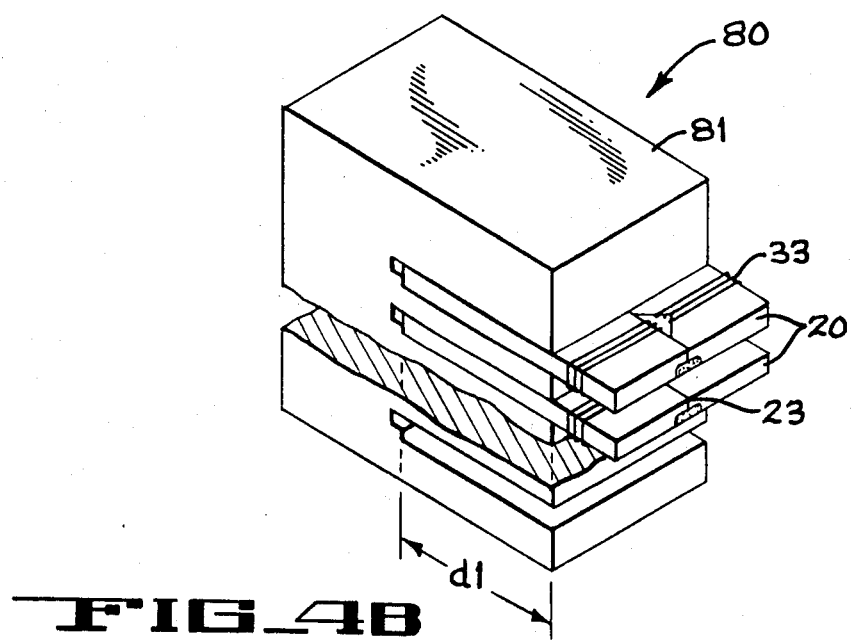
FIG_4B

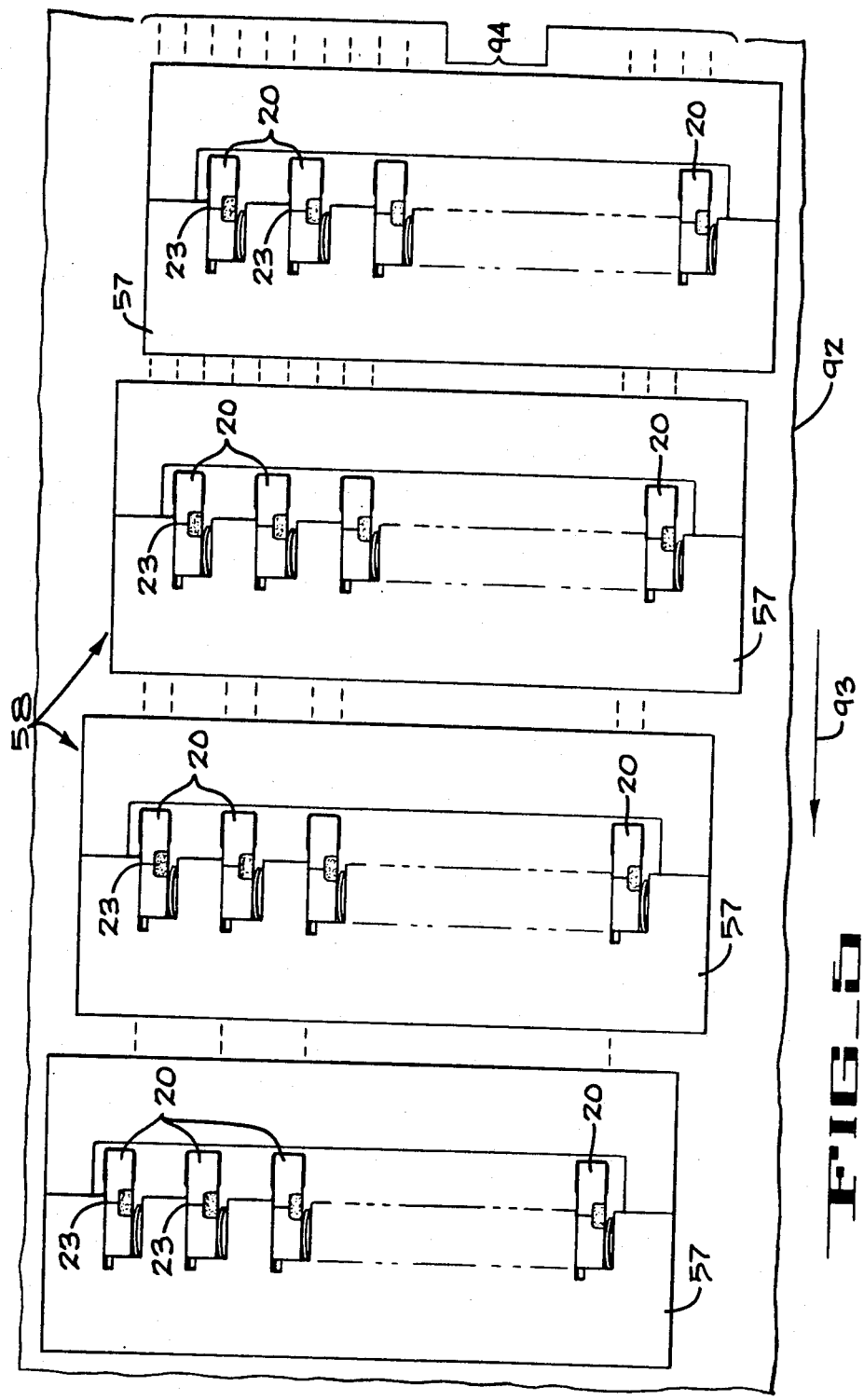

METHOD OF MANUFACTURING A MODULAR MAGNETIC HEAD ASSEMBLY

The Government has rights in this invention pursuant to Contract No. F33657-81-C-1030 awarded by the U.S. Government.

This is a division of co-pending application Ser. No. 680,873 filed on Dec. 12, 1984.

The invention relates to a multichannel magnetic head assembly having a modular structure and to a method of manufacturing the assembly. In particular, the invention relates to a modular multichannel head assembly having a simplified structure and made by a simplified manufacturing process. The multichannel head of the invention has highly accurate transducing channel locations and it is suitable for recording on, or reproducing information signals from, narrow tracks of a magnetic medium. Two or more heads may be utilized to obtain interlaced parallel channels for high density narrow track recording/reproduction.

Multichannel magnetic heads are known to have a plurality of parallel transducing channels for recording information signals on a moveable recording medium or for reproducing previously recorded signals from a medium. Each transducing channel has a magnetic core with two corresponding poles forming a transducing gap between them and a transducing winding wound around the core.

One type of conventional multichannel head employs two corresponding holders, made of a nonmagnetic material and commonly referred to as side pieces. Each side piece has a plurality of parallel grooves provided therein. The grooves of both side pieces must be in perfect alignment with each-other. Each groove receives a portion of the magnetic core, also referred to as a core member or core piece. Each core member defines a magnetic pole and it is firmly attached to the holder. A non-magnetic transducing gap forming material is provided on the poles. When the corresponding side pieces carrying the core portions are assembled together, the corresponding core portions forming each transducer must be accurately aligned to define uniform transducing gaps on each channel. During the assembly the side pieces are brought together under mechanical pressure to force the corresponding core portions together. While under pressure, the thusly assembled multichannel head is bonded together, to obtain an integral multichannel head structure.

During the final assembly and bonding of these conventional multichannel heads the magnetic core pieces are submitted to stress. Consequently, these core pieces frequently chip, crack or break. Particularly, core pieces made of hard, brittle magnetic material, such as ferrite, having a small width, for example in the order of several thousands of an inch, are particularly susceptible to mechanical damage. If one or more channels of the multichannel head are found to be defective, the entire head assembly must be rejected.

For high performance multichannel heads it is essential to obtain an accurate channel-to-channel spacing, generally referred to as track pitch, as well as uniform recording track width on all channels to allow signals recorded with a particular head to be reproduced with a different head. To obtain precise registration between the corresponding core pieces of each head half, manufacturing of these known multichannel head structures included the use of a gauge mechanism which served to accurately position the core pieces of the head halves in mirror symmetry. However, manufacturing of the precision gauges is relatively expensive. Also, the method of manufacturing the multichannel head utilizing such gauges is labor intensive and therefore expensive.

SUMMARY OF THE INVENTION

The above-indicated disadvantages of known multichannel magnetic heads are significantly reduced by the modular multichannel structure and method of the invention.

In accordance with the present invention a holder of nonmagnetic material receives a plurality of individual magnetic transducers. The transducers are arranged in parallel grooves within the holder. Each groove has a reference lateral surface provided therein to support a lateral surface of the transducer inserted in the groove. A locating element within each groove urges the transducer core against the lateral surface to obtain an accurate channel-to-channel spacing determined by the spacing of the lateral surfaces. When all the transducers are in place, they are integrally joined with the holder to obtain a desired rigid multichannel transducer structure.

It follows from the foregoing description that the modular structure of the multichannel head of the invention allows replacing defective or imperfect individual transducers prior to the final joining of the assembly together. The rejection rate of the resulting multichannel heads is thereby significantly reduced.

Another significant advantage is that track pitch tolerances are minimized by providing a reference lateral surface directly within each groove and by referencing the location of each transducer to that reference surface.

A further important advantage is eliminating the use of precision gauges for accurately locating the transducer cores within the grooves of the holder.

There is a further significant advantage of the present invention in that the individual transducers arranged in the respective transducing channels may be made by conventional batch fabrication techniques. For example, commercially available transducers such as are well known to be used for television signal recording or reproduction can be utilized. The foregoing significantly reduces the cost of manufacturing the multichannel head of the invention.

The foregoing and further features and advantages of the invention will be better understood from the following description with reference to the accompanying drawings illustrating preferred and alternative embodiments of the invention.

BRIEF DESCRIPTION OF THE DRAWINGS

FIGS. 1A and 1B are perspective views showing opposite sides of a prior art transducer.

FIG. 2 is a an exploded perspective view of a nonmagnetic transducer core holder, and of a transducer and leaf spring located therein, in accordance with the preferred embodiment of the invention.

FIGS. 3A to 3C are respective top, side and front elevation views of a multichannel transducer assembly in accordance with the preferred embodiment of the invention.

FIG. 4A is an exploded perspective view of an alternative embodiment of the invention;

FIG. 4B is a perspective view of a portion of an assembled multichannel head of FIG. 4A; and FIG. 5 is a schematic top view of a plurality of multichannel transducer assemblies of the invention for obtaining interlaced transducing channels.

DETAILED DESCRIPTION

FIGS. 1A and 1B show an example of a well known magnetic transducer 20. It will be understood from the description below that the particular transducer 20 of in FIGS. 1A and 1B represents only one example of a transducer which may be utilized in the multichannel head in accordance with the preferred embodiment of the present invention. Alternatively, other well known transducers may be utilized.

One such prior art transducer is described for example in U.S. Pat. Nos. 3,813,693 and 3,845,550 to Beverley R. Gooch, which patents are commonly owned by Ampex Corporation, the assignee of this patent application.

With reference to FIGS. 1A and 1B, each shows a perspective view of an opposite side 18 and 19 of a conventional transducer 20. As it is well known in the art, the transducer 20 has two corresponding core members 21, 22 abutting at a transducing gap plane 32. A nonmagnetic transducer gap forming material is provided at respective pole faces 24, 25 to define a transducing gap 23 therebetween. The width W1 of the abutting pole faces 24, 25 defines the transducing gap width which preferably is substantially smaller than the width W2 of the cores 21, 22. That reduced width W1 is obtained by providing a notch 26 inwardly of one lateral surface 18 of the transducer 20. The notch 26 is filled with a nonmagnetic material, preferably glass. The resulting glass pocket 26 is made flush with the transducer face 27 and with the lateral surface 18. In the preferred embodiment, the core members 21, 22 are made preferably of a magnetic ferrite material, for example PS52 manufactured by Ampex Corporation. The pocket 26 is preferably filled with Corning Glass #7570.

The transducer 20 further has a winding window 28 provided in one of the core members 22 inwardly of the transducing gap plane 32 in a well known manner. Transducing windings 33 are arranged preferably around one core member 22 and they extend through the winding window 28. In the preferred embodiment the other core member 21 does not carry a winding so that an accurate registration between that core member and a reference surface within the core holder can be obtained, as it will be described in more detail below.

A plurality of similar transducers 20 is made preferably during the same manufacturing process utilizing well known batch fabrication techniques, for example as it is known from the above-mentioned patents. The above-described transducers are of the type well known to be utilized for example for television signal recording and reproduction. Preferably all the transducers 20 utilized in the same multichannel head of the invention are made from the same block of magnetic material and during the same batch fabrication process to assure a desired uniform performance on all the transducing channels.

It is noted that in the attached drawings like elements are designated by like reference numerals throughout the drawing FIGURES.

FIG. 2 shows a perspective view of a multichannel transducer core holder 45 in accordance with the preferred embodiment of the invention. The holder 45 is made from a block of nonmagnetic material, for example ATD 48 made by Ampex Corporation, machineable glass-ceramic, or nonmagnetic ferrite. Selection of the type of material for holder 45 is made with respect to the intended application, such as contact or non-contact recording, while considering wear, when appropriate. The material of the nonmagnetic holder 45 is selected to be easily machineable and to have compatible physical and mechanical properties with the material of the magnetic cores 21, 22, such as similar coefficients of thermal expansion.

The transducer holder 45 is preferably manufactured as follows. A rectangular block of nonmagnetic material is provided with an upper surface 46 and a lower surface 47 parallel with surface 46. Thereafter a plurality of precision parallel grooves 48 is provided in the block 45 inwardly of the upper surface 46. The grooves 48 are preferably cut by a commercially available automatic slicing saw (not shown), such as made by Disco Abrasive Systems, Ltd. In the preferred embodiment one lateral surface 49a of a first cut groove 48 serves as a common reference surface for determining the pitch L1 between adjacent grooves, which corresponds to the track pitch of the multichannel head. Consequently, the surface 49b of the second cut groove 48 adjacent to the first groove is spaced at a distance L1 from the common reference surface 49a. The next cut groove 48 will have its lateral reference surface 49c spaced from the common reference surface 49a at a distance $L2=2L1$. Thus each subsequent lateral reference surface will be spaced from the common reference surface 49a by a progressively increasing integral multiple of L1. The resulting track pitch L1 is uniform and can be obtained with a precision limited only by the precision of the saw, which in the preferred embodiment is ±40 microinches. Because each subsequently cut groove is referenced to the same common reference surface, the track pitch tolerances do not accumulate except as being limited by the performance of the saw.

The width c of each groove 48 is selected greater than the previously described width W2 of the transducer 20 of FIGS. 1A and 1B. In the preferred embodiment for example $c=0.025$ inch and $W2=0.007$ inch. A desired uniform width c and uniform depth d of the grooves 48 is obtained as follows. First the plurality of lateral reference surfaces 49a to 49n is cut with a relatively narrow cutting wheel, for example having a width of 0.005 inch. The pitch of each subsequently cut surface 49b to 49n is referenced to the first cut surface as previously described. The reference lateral surfaces 49a to 49n are cut slightly deeper than a desired depth d of grooves 48 to obtain an undercut portion 53 as shown in FIG. 2. The undercut portion 53 provides a relief between a bottom surface 54 of the grooves 48 and the reference lateral surfaces 49a to 49n as it will follow from further description.

After the reference surfaces are cut as above described a second cutting wheel (not shown) is utilized which is wider than the first used wheel but slightly narrower than the desired width c of the grooves 48. For example, in the preferred embodiment the second cutting wheel may be selected 0.022 inch wide. The grooves 48 are then cut wider by the second cutting wheel to the desired width c of 0.025 inch in a well known manner. It will be understood by those skilled in the art that during the process of widening the grooves 48 with the second cutting wheel, the previously cut reference surfaces 49a to 49n should stay intact to assure proper definition of these reference surfaces.

As it is shown in FIGS. 2 and 3A, the depth d of the grooves 48 is provided slightly larger than the length s of the core member 21 to obtain better support of the transducer at the transducing gap plane as it will be explained later in more detail.

It is seen from the foregoing description and from FIG. 2 that by providing the undercuts 53 any undesirable radius between the surfaces 49a to 49n and surface 54 is eliminated. As well known in the art, such a radius between two rectangular surfaces is obtained due to the imperfection of cutting tools. By removing the undesired radius from the grooves 48 all the transducers 20 inserted in grooves 48 will be supported by the bottom surface 54 at a uniform depth d from the upper surface 46. The foregoing provision is useful in preventing gap scatter within the multichannel head as it will become more apparent from further description.

After the grooves are cut as above described, an individual magnetic transducer 20 is inserted into each parallel groove 48 in accordance with the preferred embodiment as follows.

FIG. 2 shows an exploded view of a transducer 20 and a locating spring 55 to be inserted into the same groove 48 with the transducer. A lateral surface 19 of the transducer 20 abuts the reference lateral surface 49a of the groove. The leaf spring 55 is inserted adjacent to the other lateral surface 18 of the transducer, opposite surface 19. Preferably a commercially available leaf spring is used. The leaf spring 55 serves to firmly hold each transducer 20 in a desired position during alignment within the holder and during mechanical and electrical testing, prior to the final bonding of the transducers with the holder 45. The leaf spring is preferably made of a nonmagnetic flexible material which is sufficiently stiff to hold the transducers in place during alignment and assembly. In the preferred embodiment the leaf spring 55 is made of berylim copper, but it may be made of another suitable metal or plastic material.

Alternatively, as the locating element 55 a wedge may be utilized to force the transducer 20 against the reference lateral surface. The wedge may be made of a nonmagnetic material, for example metal or plastic, having mechanical properties compatible with those of the material of the holder 45.

As it is seen from FIG. 2, the transducers 20 are inserted into the grooves 48 with their core members 21 which do not have transducing windings thereon, while those portions of core members 22 which carry the transducing windings extend from the grooves. The foregoing feature is useful for obtaining precise abutment of the transducer cores with the reference surfaces 49a to 49n. It is preferable that the grooves 48 have a depth d slightly larger than the length s of the core members 21 to obtain a desired support for the transducing gap plane 32 provided between the core members 21, 22.

After all the transducers 20 and locating springs 55 and inserted into the parallel grooves 48, the individual transducers 20 are aligned to obtain a desired precise alignment at the face portions 27 of all the transducers as well known. Thereafter, each transducer 20 is examined to determine whether any mechanical damage has occurred during the assembling process, such as chipping, cracking or breaking of the cores or whether the transducing gap has been damaged. The electrical performance of the transducers 20 is also tested. Those transducers which do not meet the specifications are replaced. When all the aligned transducers 20 satisfy the requirements, a cover piece 70 is placed over the holder 45 and the entire assembly is bonded together, preferably potted with epoxy, utilizing well known bonding techniques. It is noted that the epoxy material is not shown in the drawings for better clarity of representation.

The cover piece 70 is preferably made by machining a rectangular block of nonmagnetic material, preferably the same material as that of the nonmagnetic holder 45. The cover piece 70 has an upper surface 71 and a parallel lower surface 72. A recess 73 is provided in the cover piece 70, preferably by machining inwardly of the lower surface 72. The recess 73 extends over the portion of holder 45 comprising the transducers 20. The depth of the recess 73 is selected to slightly exceed the height of the portion of transducers 20 extending over the upper surface 46 of holder 45 which portions carry the transducing windings.

After the transducers 20 and locating springs 55 are inserted in the grooves 48 and aligned as previously described, the cover 70 is placed over the holder 45 with the upper surface 46 of the holder and lower surface 72 of the cover abutting.

FIGS. 3A to 3C respectively show a top, side and front elevation view of a resulting integrally joined multichannel head assembly 58 of the invention, basically corresponding to the above-described embodiment of FIG. 2. However, there is a difference in that in FIGS. 3A to 3C, transducers 20 are arranged in the grooves 48 with their face portions 27 slightly extending from the holder 45. For example, the face portions 27 may extend over the front surface 57 of the holder by 0.003 inch. Thereby a unit pressure between the transducer and recording medium is maximized. The foregoing serves to minimize head-to-medium separation losses as it is well known for obtaining optimum high frequency response in contact recording or reproduction.

Alternatively, the face portion 27 of transducers 20 can be made flush with the front surface 57 of the holder 45, as it has been shown in FIG. 2.

In both instances, that is, whether the transducer faces extend from the holder or are made flush therewith, the integrally joined multichannel structure may be contoured in a well known manner.

FIGS. 4A and 4B show an alternative embodiment of the modular multichannel transducer assembly of the present invention. Because of the similarities of the multichannel transducer assembly 80 of FIGS. 4A and 4B to the previously described preferred embodiment of FIGS. 2 to 3C, only the differences from the previously described embodiment will be described to avoid repetition.

In the transducer core holder 81 a plurality of parallel grooves 82 is provided inwardly of an upper surface 83, in a similar manner as previously described. In this alternative embodiment the transducers 20 are located in the grooves 82 in a position obtained by rotating by 90 degrees with respect to the position of the transducers 20 in the holder 45 of FIGS. 2 to 3C. As it is seen from FIGS. 4A and 4B, the transducers 20 are supported by the bottom surface 84 of the grooves 48 at their rear surfaces 50, opposite their face portions 27.

Preferably the depth d1 of the grooves 82 is such that only a portion of the transducer core which is free of the transducing windings 33 is supported within the groove by a respective reference lateral surface 86a to 86n. To obtain the foregoing, the depth d1 of the grooves 82 is selected to correspond to the distance between the winding window 28 and the rear surface 50 of the transducer 20, as it is shown in FIG. 4A. As a result, transducing winding carrying portions of the transducer core members 21, 22 extend above the upper surface 83 of holder 81.

A locating means 85 is provided, preferably in the form of a leaf spring, which is similar to the previously described locating means 55 of FIG. 2. After all the transducers 20 have been inserted into the grooves 82 as above-described and shown in FIGS. 4A and 4B, with a winding free portion of each lateral surface 90 abutting a reference surface 86a to 86n, respectively, the leaf spring 85 is inserted in each groove to urge the transducer core against that reference surface, similarly, as it has been previously described.

In the presently described embodiment of FIGS. 4A, 4B the individual transducers 20 are carefully inspected for mechanical and electrical defects and imperfections and those transducers which do not satisfy the requirements are replaced. Then all the transducers 20 are aligned within the holder 81 to obtain a desired precise alignment of the transducing gaps 23. Thereafter they are firmly attached to the holder for example by a well known epoxy or glass bonding technique.

When comparing the alternative embodiment of FIGS. 4A, 4B to the previously described preferred embodiment of FIGS. 2 to 3C, it has an advantage that the transducing windings may be placed over both core members, rather than just over one core member as in FIGS. 2 to 3C. However, in the embodiment of FIGS. 4A and 4B a relatively larger portion of the transducer face remains unsupported.

An example of utilizing the modular multichannel head of the invention to obtain recording or reproduction on high density narrow tracks of a magnetic medium is shown in FIG. 5 and will be described below.

FIG. 5 shows schematically a plurality of identical modular multichannel heads of the present invention which are spaced from each-other along a magnetic medium in a well known manner to obtain interlaced recording tracks provided by the respective channels of each head. For example, all the respective multichannel heads may be of the type shown at 58 in FIGS. 2 to 3C or of the type shown at 80 in FIGS. 4A and 4B.

The multichannel heads 58 shown in FIG. 5 are spaced from each-other in a staggered relationship such a way that the transducing gaps 23 of each transducer 20 of any head 58 are offset with respect to the transducing gaps of any other head 58 across the recording medium 92. Each transducing gap 23 is aligned with a particular recording track of the recording medium 92 which track is spaced at a predetermined small distance from an adjacent track on that medium. In FIG. 5 the medium 92, for example a magnetic tape, moves in a longitudinal direction designated by arrow 93 and the transducing gaps 23 of the respective heads 58 are offset in a direction substantially perpendicular to direction 93. As the tape passes under the transducing gaps 23 of thusly spaced transducers 20, which are for example in a recording mode, a plurality of interlaced recorded tracks 94 is obtained as it is well known in the art. A plurality of high density narrow tracks may be thereby obtained.

It is noted that for better clarity of representation, in FIG. 5 the multichannel heads 58 are shown as being rotated by 180 degrees, that is, having their front surfaces 57 and transducing gaps 23 facing the viewer rather than the surface of the magnetic tape 92.

In addition to the advantages of reduced rejection rate as it has been described above in connection with the modular multichannel head of the invention, it is seen from the foregoing description that the present invention has the advantage of utilizing only a single precision cut transducer core holder or side piece for each multichannel head. The individual transducers are referenced against precision surfaces provided directly in the holder. Thereby a need for precision gauges to obtain accurate channel-to-channel locations in the multichannel head is eliminated.

It is further seen from the disclosure that commercially available batch fabricated individual transducers can be utilized in the respective transducing channels of the multichannel head of the invention. The manufacturing process is thereby considerably simplified when comparing to known processes of making prior art multichannel heads.

What is claimed:

1. A method of making a modular multichannel magnetic head assembly, comprising the steps of:
   providing a plurality of individual magnetic transducers, each having a magnetic core with two confronting poles defining a transducing gap therebetween and each transducer core having two opposite lateral surfaces defining a width of said transducer;
   making a nonmagnetic holder with a plurality of parallel grooves therein and forming a reference lateral surface within each said groove, said grooves having a width greater than the width of said transducers, the reference surfaces of each groove being spaced a predetermined distance from each other;
   inserting one said magnetic transducer in each said groove with a first said lateral surface of said core abutting said reference lateral surface of said groove;
   arranging a locating means in each said groove adjacent a second lateral surface of said transducer for urging said first lateral surface against said reference lateral surface;
   adjusting said individual magnetic transducers within said grooves to have their respective transducing gaps aligned; and
   integrally joining said transducers with said holder.

2. The method of claim 1 wherein the step of arranging said locating means in each said groove comprises inserting a leaf spring in each said groove adjacent said second lateral surface.

3. The method of claim 1 wherein the step of integrally joining said transducers with said holder comprises a bonding step.

4. The method of claim 1 further comprising the step of inspecting said individual transducers for mechanical and electrical damages thereof and replacing damaged transducers prior to the step of integrally joining the transducers with the holder.

5. The method of claim 1 wherein the step of providing a plurality of parallel grooves comprises providing a first groove in said holder having a reference lateral surface and providing a second and subsequent grooves having respective parallel reference surfaces spaced at predetermined distances from said reference surface of the first groove.

6. The method of claim 5 wherein the step of providing said plurality of parallel grooves further comprises cutting each said groove with a narrow blade to obtain said reference lateral surfaces and thereafter enlarging the width of said grooves by cutting with a wider blade to obtain a desired width of said grooves.

7. The method of claim 6 further comprising the step of cutting said grooves with said narrow blade at a depth greater than provided by said wider blade.

8. The method of claim 1 wherein the step of providing a plurality of magnetic transducers comprises providing each transducer with a first and a second confronting core member abutting at a transducing gap plane and having a transducing gap defining face portion, forming a transducing winding window in said first core member inwardly of said transducing gap plane, winding a transducing winding around said first core member and through said winding window, and wherein the step of inserting a transducer in each said groove comprises having said first lateral surface of said second core member and of a portion of said first core member which is free of transducing winding abutting the reference lateral surface within said groove, while having a transducing winding carrying portion of the first core member extending from said groove.

9. The method of claim 8 wherein the step of adjusting said transducers within said grooves comprises aligning said transducing gap defining face portions flush with a front surface of said holder.

10. The method of claim 8 wherein the step of adjusting said transducers within said grooves comprises aligning said transducers to have their transducing gap defining face portions extending from an upper surface of said holder.

11. The method of claim 8 where said portions of said first core members extend above an upper surface of said holder, further comprising the steps of providing a cover piece of a nonmagnetic material, providing a lower surface on said cover piece confronting said upper surface of said holder, providing a recess in said cover piece for accommodating said extending portions of said first core members and assembling said cover piece with said core holder with said confronting surfaces abutting prior to said integrally joining step.

12. The method of claim 1 wherein the step of providing a plurality of magnetic transducers comprises providing each transducer with two confronting core members abutting at a transducing gap plane and having a transducing gap defining face portion, forming a transducing winding window in at least one core member inwardly of said transducing gap plane and winding a transducing winding around at least one core member and through said winding window; and
wherein said inserting step comprises supporting a rear surface of each said transducer, opposite said face portion by a bottom surface of said groove, and supporting a winding free portion of said first lateral surface of both core members by said reference lateral surface within each groove while having a portion of the transducer including the transducing winding and the transducing gap extending from said groove.

13. The method of claim 1 further comprising the step of arranging at least two identical multichannel head assemblies with their respective transducing gaps offset with respect to each-other in a direction substantially perpendicular to a direction of movement of said recording medium.

14. A method of making a modular multichannel head assembly comprising the steps of:
providing a plurality of individual magnetic transducers, each having a first and a second confronting magnetic core member abutting at a transducing gap plane and having a transducing gap defining face portion, each transducer having two opposite lateral surfaces defining a width of said transducer;
forming a transducing winding window in said first core member inwardly of said transducing plane and winding a transducing winding around said first core member and through said winding window;
making a nonmagnetic holder;
cutting a plurality of parallel grooves in said holder inwardly of an upper surface thereof at a selected depth, while forming a reference lateral surface within each groove spaced at a predetermined distance from a common reference surface, said grooves having a width greater than said transducer width;
inserting one said magnetic transducer in each said groove with a first lateral surface of said second core member and a portion of said first core member which is free of transducing winding abutting said reference lateral surface of said groove, while having a transducing winding carrying portion of the first core member extending from said groove;
arranging a locating means in each said groove adjacent a second lateral surface of said transducer for urging said first lateral surface against said reference lateral surface;
adjusting said individual magnetic transducers within said grooves to have their respective transducing gaps aligned; and
integrally joining said transducers with said holder.

15. A method of making a modular multichannel head assembly comprising the steps of:
providing a plurality of individual magnetic transducers, each having a first and a second confronting magnetic core member abutting at a transducing gap plane and having a transducing gap defining face portion, each transducer having two opposite lateral surfaces defining a width of said transducer;
forming a transducing winding window in at least one core member inwardly of said transducing plane and winding a transducing winding around at least one core member and through said winding window;
making a nonmagnetic holder;
cutting a plurality of parallel grooves in said holder inwardly of an upper surface while forming a reference lateral surface within each groove spaced at a predetermined distance from a common reference surface, and forming a bottom surface in each groove at a selected depth from said upper surface, said grooves having width greater than said transducer width;
inserting one said magnetic transducer in each groove in such a way that a rear surface of said transducer, opposite its face portion is supported by the bottom surface of said groove and that a portion of said first lateral surface of both core members which portion is free of transducing winding is supported by said reference lateral surface while a portion of the transducer including the transducing winding and transducing gap extends from the groove;

arranging a locating means in each said groove adjacent a second lateral surface of said transducer for urging said first lateral surface against said reference lateral surface;

adjusting said individual magnetic transducers within said grooves to have their respective transducing gaps aligned; and integrally joining said transducers with said holder.

* * * * *